US012069456B2

(12) United States Patent
Sato et al.

(10) Patent No.: US 12,069,456 B2
(45) Date of Patent: Aug. 20, 2024

(54) TACTILE SENSE PRESENTATION APPARATUS, ELECTRONIC APPARATUS, ACCESSORY, AND HOLDING APPARATUS

(71) Applicant: SONY GROUP CORPORATION, Tokyo (JP)

(72) Inventors: Masahiro Sato, Tokyo (JP); Koji Fukumoto, Tokyo (JP); Akira Ono, Tokyo (JP); Tomoaki Takuma, Tokyo (JP); Satoshi Suzuki, Tokyo (JP); Asami Yamagishi, Tokyo (JP); Tomomasa Yokoyama, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 574 days.

(21) Appl. No.: 17/295,138

(22) PCT Filed: Nov. 13, 2019

(86) PCT No.: PCT/JP2019/044483
§ 371 (c)(1),
(2) Date: May 19, 2021

(87) PCT Pub. No.: WO2020/110721
PCT Pub. Date: Jun. 4, 2020

(65) Prior Publication Data
US 2022/0004258 A1 Jan. 6, 2022

(30) Foreign Application Priority Data

Nov. 28, 2018 (JP) ................. 2018-221960

(51) Int. Cl.
*H04R 5/033* (2006.01)
*F15B 21/045* (2019.01)
(Continued)

(52) U.S. Cl.
CPC .......... *H04R 5/033* (2013.01); *F15B 21/045* (2013.01); *G06F 1/163* (2013.01); *G06F 3/016* (2013.01);
(Continued)

(58) Field of Classification Search
CPC ..... G01R 33/283; G01R 33/288; A61F 11/14; A61F 2250/0003; H04R 1/1083;
(Continued)

(56) References Cited

U.S. PATENT DOCUMENTS

| 5,774,096 A | 6/1998 | Usuki et al. | |
|---|---|---|---|
| 2016/0080855 A1* | 3/2016 | Greenberg | H04R 1/028 381/74 |
| 2018/0190087 A1* | 7/2018 | Maalouf | G06F 1/163 |

FOREIGN PATENT DOCUMENTS

| CN | 108279769 A | 7/2018 |
|---|---|---|
| EP | 679919 A2 | 11/1995 |

(Continued)

OTHER PUBLICATIONS

International Search Report and Written Opinion of PCT Application No. PCT/JP2019/044483, issued on Dec. 17, 2019, 10 pages of ISRWO.

*Primary Examiner* — Carolyn R Edwards
*Assistant Examiner* — Julie X Dang
(74) *Attorney, Agent, or Firm* — CHIP LAW GROUP

(57) ABSTRACT

Provided is a tactile sense presentation apparatus that includes a mounting portion, a pump unit, and a control unit. The mounting portion is mounted on a target object and includes a surface material which is deformable in at least a part of a contact portion with the target object. The pump unit includes a flow path, which is connected to the mount-
(Continued)

ing portion, and feeds a fluid for deforming the surface material to the mounting portion. The control unit controls driving of the pump unit.

15 Claims, 12 Drawing Sheets

(51) Int. Cl.
   *G06F 1/16*     (2006.01)
   *G06F 3/01*     (2006.01)
   *G08B 6/00*     (2006.01)
(52) U.S. Cl.
   CPC .......... *G08B 6/00* (2013.01); *F15B 2211/205* (2013.01); *F15B 2211/6655* (2013.01)
(58) Field of Classification Search
   CPC .... H04R 1/1008; H04R 5/033; H04R 1/1016; H04R 25/656; A61B 5/055; G06F 3/016; G06F 1/163; G06F 3/012; G08B 6/00

USPC .......................................... 381/370; 181/129
See application file for complete search history.

(56)     References Cited

FOREIGN PATENT DOCUMENTS

| | | | |
|---|---|---|---|
| EP | 3346370 A1 | | 7/2018 |
| JP | 08-5953 A | | 1/1996 |
| JP | 08-88889 A | | 4/1996 |
| JP | 08088889 A | * | 4/1996 |
| JP | 2007-197034 A | | 8/2007 |
| JP | 2008-263643 A | | 10/2008 |
| JP | 2016-197352 A | | 11/2016 |
| JP | 2018-109999 A | | 7/2018 |
| KR | 10-1995-0035465 A | | 12/1995 |
| KR | 10-2018-0080994 A | | 7/2018 |
| TW | 352890 U | | 2/1999 |

* cited by examiner

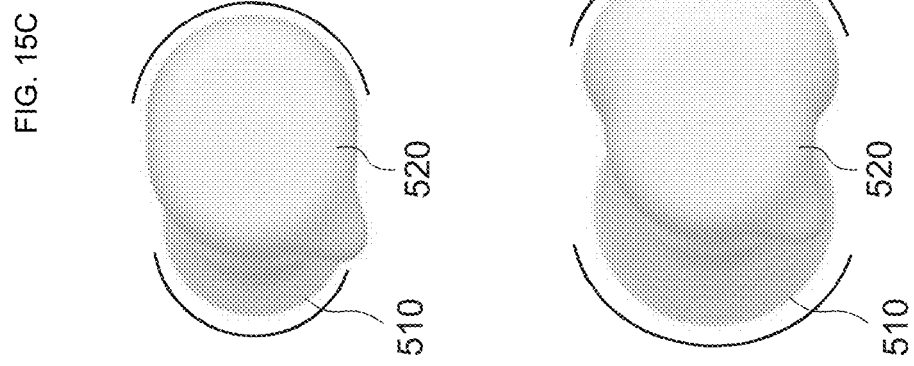
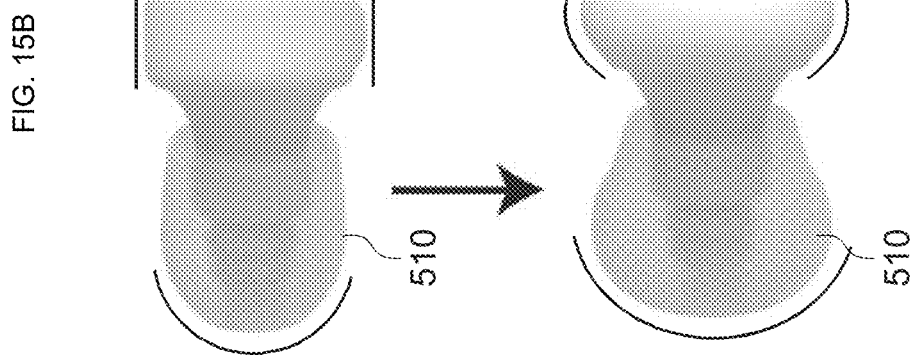
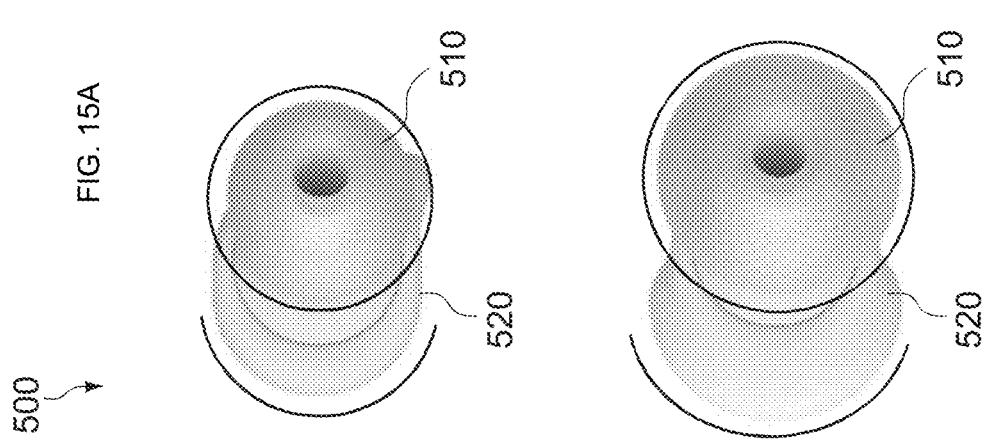

TACTILE SENSE PRESENTATION APPARATUS, ELECTRONIC APPARATUS, ACCESSORY, AND HOLDING APPARATUS

CROSS REFERENCE TO RELATED APPLICATIONS

This application is a U.S. National Phase of International Patent Application No. PCT/JP2019/044483 filed on Nov. 13, 2019, which claims priority benefit of Japanese Patent Application No. JP 2018-221960 filed in the Japan Patent Office on Nov. 28, 2018. Each of the above-referenced applications is hereby incorporated herein by reference in its entirety.

TECHNICAL FIELD

The present technology relates to a tactile sense presentation apparatus utilizing fluid pressure and to an electronic apparatus, an accessory, and a holding apparatus including the same.

BACKGROUND ART

For example, a device to be mounted on a human body, such as headphones, needs to be fixed at a constant pressing force for its stable mounting. However, too high a pressing force causes discomfort in mounting for a long time and too low a pressing force causes instability in mounting. Therefore, parts having different sizes such as S (small), M (middle), and L (large) are used in some in-ear headphones and the like. In wristwatch straps and the like, the mounting pressure is adjusted in accordance with each user by the hole position for a fixed buckle tongue or the strap length.

For example, Patent Literature 1 has disclosed a headphone capable of preventing positional deviation of a driver unit by securing force to press the driver unit against an ear of a user with a certain pressure.

CITATION LIST

Patent Literature

Patent Literature 1: Japanese Patent Application Laid-open No. 2008-263643

DISCLOSURE OF INVENTION

Technical Problem

In recent years, an improvement of the mountability (wearability) from the viewpoint of stability, comfort, and the like is desirable for a wearable electronic apparatus.

In view of the above-mentioned circumstances, it is an object of the present technology to provide a tactile sense presentation apparatus, an electronic apparatus, an accessory, and a holding apparatus, which can achieve an improvement of the mountability.

Solution to Problem

A tactile sense presentation apparatus according to an embodiment of the present technology includes a mounting portion, a pump unit, and a control unit.

The mounting portion is mounted on a target object and includes a surface material which is deformable in at least a part of a contact portion with the target object.

The pump unit includes a flow path, which is connected to the mounting portion, and feeds a fluid for deforming the surface material to the mounting portion.

The control unit controls driving of the pump unit.

Accordingly, an improvement in mountability can be achieved.

The mounting portion may further include a variable-volume structure portion capable of deforming the surface material by receiving pressure of the fluid.

The surface material may have a plurality of regions having different degrees of elongation when receiving the pressure of the fluid.

The structure portion may have an annular variable-pressure chamber communicable with the flow path.

The structure portion may have a plurality of variable-pressure chambers capable of individually controlling an internal pressure.

The tactile sense presentation apparatus may further include an electronic device that is disposed in the mounting portion and capable of presenting a sense other than a tactile sense.

The tactile sense presentation apparatus may further include a first detector that detects the pressure of the fluid, in which the control unit may control the driving of the pump unit on the basis of an output of the first detector.

The tactile sense presentation apparatus may further include a second detector that detects a move or direction of the mounting portion, in which the control unit may control the driving of the pump unit on the basis of an output of the second detector.

The mounting portion may further include a temperature detector that detects a temperature of the surface material or the fluid, and a temperature adjustment unit that adjusts the temperature of the surface material or the fluid.

The control unit may control the driving of the pump unit on the basis of notification information from an external apparatus.

The fluid may be air.

The tactile sense presentation apparatus may be applied to an electronic apparatus such as an over-ear headphone, an in-ear headphone, a neck speaker, a head-mounted display, an AR glass, a VR glass, a wristwatch, and a hearing aid.

The tactile sense presentation apparatus may be applied to an accessory such as eyeglasses, a glove, a shoe, a hat, a belt, or clothes.

A holding apparatus according to an embodiment of the present technology includes a mounting portion, a pump unit, and a control unit.

The mounting portion is mounted on a target object and includes a surface material which is deformable in at least a part of a contact portion with the target object.

The pump unit includes a flow path, which is connected to the mounting portion, and feeds a fluid for deforming the surface material to the mounting portion.

The control unit controls driving of the pump unit.

BRIEF DESCRIPTION OF DRAWINGS

FIGS. 15A, 15B, and 15C An overall view of a tactile sense presentation apparatus according to a fifth embodiment of the present technology, in which (FIG. 15A) shows perspective views from the front side, (FIG. 15B) shows side views, and (FIG. 15C) shows perspective views from the back side.

OUTLINE OF PRESENT TECHNOLOGY

As an embodiment, a tactile sense presentation apparatus according to the present technology is mounted on a human body (head, wrist, etc.) and its mounting portion is configured to be deformable by the pressure of a fluid (air, liquid). For example, the shape, hardness, and contact state of the mounting portion are optimized in accordance with a user's body shape, the user's move state (stationary, violent move), the wearing comfort required by the user, and the like, to achieve stable mountability, comfortable mountability, or stable additional functions (sound insulation, heat insulation, etc.)

In a tactile sense presentation apparatus according to an embodiment of the present technology, a small pump is disposed inside an independent mobile electronic apparatus. A portion in which the pump is to be mounted on a human body is connected through a flow path. A part of a portion to be held in contact with the human body or the entire portion to be held in contact with the human body is formed from a deformable material. The deformation of the material is controlled by an intake/output operation of the pump, to thereby adjust the state of contact with the human body and achieve wearing comfort and stability. In addition, the comfort can be further increased by also controlling the temperature.

Here, the tactile sense means a tactile sense presented to the user and refers to a wearing feeling, a hand feeling, vibrations, or the like, for example.

The present technology can be applied to an electronic apparatus that presents vision, hearing, taste, smell, and the like. Examples of the electronic apparatus include over-ear headphones, in-ear headphones, a neck speaker, a head-mounted display, an AR glass, a VR glass, a wristwatch, a hearing aid, and the like. Furthermore, the present technology can also be applied to an accessory such as belts, casts, masks, clothes (e.g., jackets, pants, shirts, underwear, socks) and the like.

Embodiments in accordance with the present technology will be described below with reference to the drawings.

[Tactile Sense Presentation Apparatus]

First Embodiment

Figure 1:
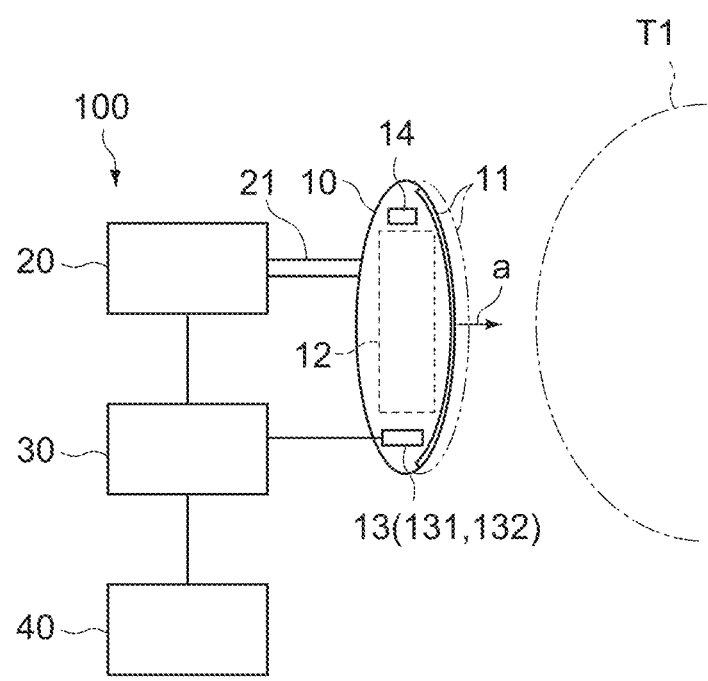
FIG. 1 A schematic configuration diagram showing a tactile sense presentation apparatus according to a first embodiment of the present technology.

FIG. 1 is a schematic configuration diagram showing a tactile sense presentation apparatus 100 according to a first embodiment of the present technology.

The tactile sense presentation apparatus 100 according to this embodiment includes a mounting portion 10, a pump unit 20, and a control unit 30.

The mounting portion 10 is configured to be mountable on a human body. The mounting portion 10 is mounted as an object T1, for example, on the user's head. The mounting portion 10 is provided on a human body mounting portion (pinna mounting portion) in an electronic apparatus such as over-ear headphones or in-ear headphones, for example. The mounting portion 10 includes a surface material 11 which is deformable in at least a part of a contact portion with the object T1.

The surface material 11 constitutes a part of the outer surface of the mounting portion 10 and typically constitutes a contact surface with the object T1. The surface material 11 is not particularly limited as long as it is a deformable material. Examples of the surface material 11 include various materials such as a film material such as a cloth and leather and a bulk material such as a sponge.

The mounting portion 10 has a structure portion 12 capable of deforming the surface material 11 toward the object T1 as shown by the arrow a in the figure by the pressure of the fluid fed from the pump unit 20. The structure portion 12 may be, for example, a variable-volume space portion or a bag-like object for applying a back pressure to the surface material 11 by receiving the fluid fed from the pump unit 20, or may be a cylinder unit or the like for applying a deformation stress to the surface material 11 by receiving the fluid.

The pump unit 20 has a flow path 21 which is connected to the mounting portion 10. The pump unit 20 is configured as a small pump capable of feeding the fluid for deforming the surface material 11 to the mounting portion 10 or discharging the fluid from the mounting portion 10. The fluid may be either gas or liquid. The air (outside air) is used as the fluid in this embodiment.

The pump unit 20 includes, for example, a first port communicating with the outside air, a second port communicating with the structure portion 12 via the flow path 21, a pump chamber that transfers the fluid between the first port and the second port, a valve mechanism that switches the transfer direction of the fluid between the first port and the second port, and the like.

The control unit 30 controls the driving of the pump unit 20. The control unit 30 is typically configured as a microcomputer including a CPU, a memory, and the like. The control unit 30 controls the amount of deformation of the surface material 11 of the mounting portion 10 by controlling the intake and output of the fluid in the pump unit 20.

Specifically, the driving of the pump unit 20 is controlled such that the pressure applied to the surface material 11 is a predetermined value or a predetermined range. Accordingly, a desired pressing force of the surface material 11 against the object T1 can be achieved.

The pressing force of the surface material 11 against the object T1 can be set as appropriate in accordance with the shape and the site of the object T1. Moreover, the present technology is not limited to the configuration in which the entire surface material 11 is deformed, and only a part of the surface material 11 may be configured to be deformable. In this case, it is possible to control the contact area with the object T1 not only by the pressure but also by the deforming portion. Moreover, the pressing force does not need to be fixed, but may be changed over time.

The control unit 30 may control the driving of the pump unit 20 so as to be capable of presenting tactile senses other than the pressing force to the object T1, which is the user, through the surface material 11. For example, the control unit 30 may control the driving of the pump unit 20 on the basis of notification information from an external device. In this case, for example, a vibrotactile sense of a predetermined frequency for notifying an incoming call to a smartphone carried by the user may be presented to the user.

The mounting portion 10 may include various built-in sensors 13 as shown in FIG. 1. The sensors 13 may be, for example, a pressure detector 131 that detects the pressure of the fluid fed from the pump unit 20 to the mounting portion 10. In this case, the control unit 30 can adjust the pressure of the fluid introduced into the mounting portion 10 to a desired pressure by controlling the driving of the pump unit 20 on the basis of the output of the pressure detector 131.

The sensors 13 may be a temperature detector 132 that detects the temperature of the fluid in the mounting portion 10 instead of or in addition to the pressure detector. As shown in FIG. 1, the mounting portion 10 may further include a temperature adjustment portion 14 capable of adjusting the temperature of the fluid or the surface material 11. In this case, the control unit 30 may perform control to adjust the temperature adjustment portion 14 such that the fluid or surface material 11 has a desired temperature on the basis of the output of the temperature detector 132. For example, a heater or a thermoelectric conversion element such as a Peltier element can be employed as the temperature adjustment portion 14.

The tactile sense presentation apparatus 100 may further include a power supply unit 40 that supplies power to the pump unit 20 and the control unit 30. The power supply unit 40 is typically a battery. The battery may be a rechargeable secondary battery or may be a solar cell.

The tactile sense presentation apparatus 100 configured as described above is installed in a driver unit in over-ear headphones or a pinna mounting portion in in-ear headphones, for example. Accordingly, it is possible to optimize the mounting pressure, and thus it is possible to secure stable mountability and comfortable mountability. Moreover, even if it is used for a long time, a feeling of fatigue and a feeling of pressure can be reduced. Furthermore, it is possible to prevent deterioration of the sound insulation property and sound quality and the like due to deviation of the mounting position or the like.

The amount of deformation of the surface material 11 of the mounting portion 10 may be a fixed value or may be variably adjusted in accordance with the user's preference. Accordingly, it is possible to achieve an appropriate mounting pressure in accordance with the user's attitude and move state.

Furthermore, the temperature adjustment portion 14 provided in the mounting portion 10 makes it possible to warm the surface material 11, such that it can be used as a cold protector even when it is used outdoors where the outdoor air temperature is low.

The tactile sense presentation apparatus 100 configured as described above is not limited to the headphones or the like, and can be applied to other electronic apparatuses such as a neck speaker, a head-mounted display, an augmented reality (AR) glass, a virtual reality (VR) glass, a mixed reality (MR) glass, a substitutional reality (SR) glass, a wristwatch, and a hearing aid.

Alternatively, the tactile sense presentation apparatus 100 configured as described above is not limited to the electronic apparatus, and can be similarly applied to an accessory such as eyeglasses, gloves, shoes, hats, belts, clothes, and the like.

Furthermore, the tactile sense presentation apparatus 100 according to this embodiment may be configured as a holding apparatus capable of holding an object other than the human body by a desired pressing force. For example, the present technology can also be applied as a part of a packaging material or the entire packaging material for packaging an article. In this case, for example, an article such as a precision device and an art object can be appropriately protected from vibrations and shocks during conveyance.

Second Embodiment

Figure 2:
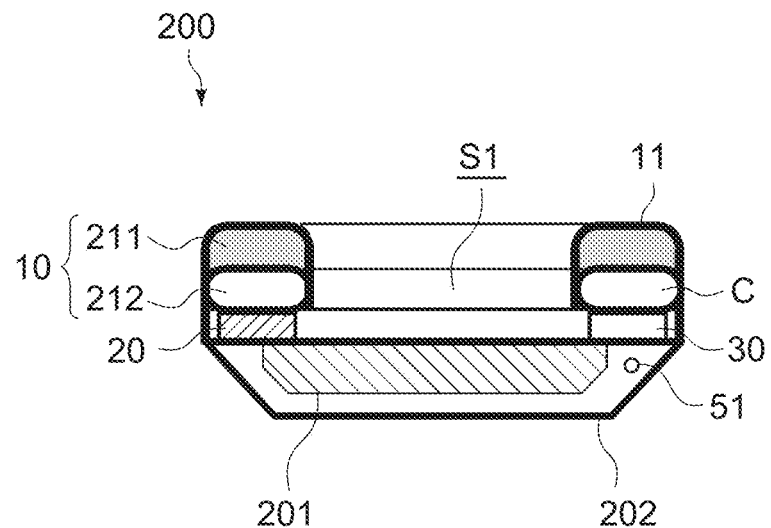
FIG. 2 A schematic side cross-sectional view of a tactile sense presentation apparatus according to a second embodiment of the present technology.
Figure 3:
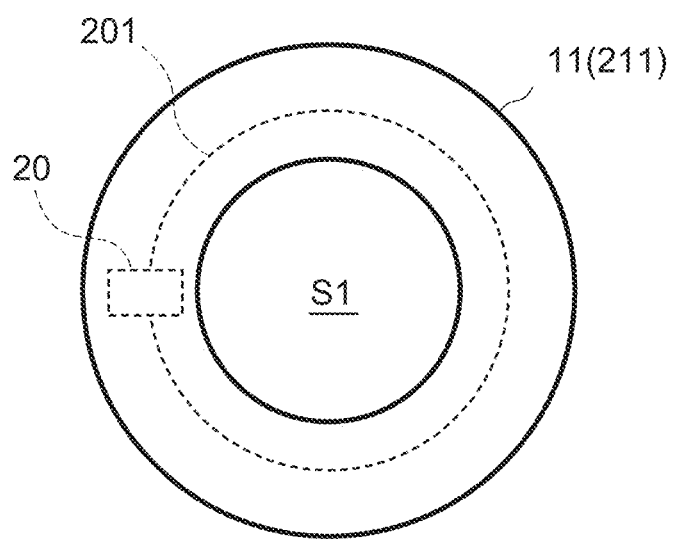
FIG. 3 A plan view of the tactile sense presentation apparatus of FIG. 2.

FIG. 2 is a schematic cross-sectional side view of a tactile sense presentation apparatus 200 according to a second embodiment of the present technology and FIG. 3 is a plan view thereof. It should be noted that parts corresponding to those of the first embodiment will be denoted by the same reference signs and detailed descriptions thereof will be omitted.

The tactile sense presentation apparatus 200 according to this embodiment constitutes the left and right headphone units in the overhead headphones as an electronic apparatus. The left and right headphone units are respectively provided at both ends of a headband (not shown), and here, a headphone unit on one side (e.g., left side) will be described.

The tactile sense presentation apparatus 200 includes a mounting portion 10, an acoustic generator 201, and a housing 202 that houses the acoustic generator 201 as an electronic device. The acoustic generator 201 is typically configured as an electromagnetic dynamic speaker having a diaphragm, a voice coil motor, or the like. The housing 202 may be configured as a part of the mounting portion 10.

The mounting portion 10 is supported by the housing 202. The mounting portion 10 has a multilayer structure including an elastic layer 211 and a structure portion 212. The elastic layer 211 is constituted by a foamable cushion material such as a sponge, a synthetic rubber such as a low repulsion urethane, and the like and its surface (mounting surface) is coated with a surface material 11 such as synthetic leather. The elastic layer 211 is formed in an annular shape as shown in FIG. 2.

The structure portion 212 is disposed between the elastic layer 211 and the housing 202. The structure portion 212 is a variable-volume bag-like object made of an elastic material, and is configured to be capable of deforming the elastic layer 211 and the surface material 11 by receiving fluid pressure from the pump unit 20. That is, the structure portion 212 forms an annular variable-pressure chamber C communicable with the flow path of the fluid fed from the pump unit 20. The outer and inner diameters of the structure portion 212 are typically the same as the outer and inner diameters of the elastic layer 211. The respective inner circumferential surfaces of the elastic layer 211 and structure portion 212 form a sound path S1 that directs the sound generated from the acoustic generator 201 to the user's ear.

The pump unit 20 and the control unit 30 are disposed at predetermined positions inside the housing 202. The pump unit 20 delivers the fluid to the variable-pressure chamber C or discharges the fluid from the variable-pressure chamber C on the basis of a command from the control unit 30.

Figure 4:
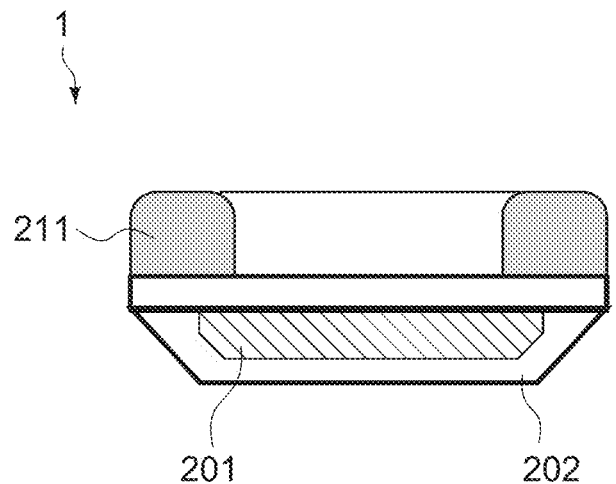
FIG. 4 A schematic configuration diagram of a headphone unit according to a comparative example.
Figure 5:
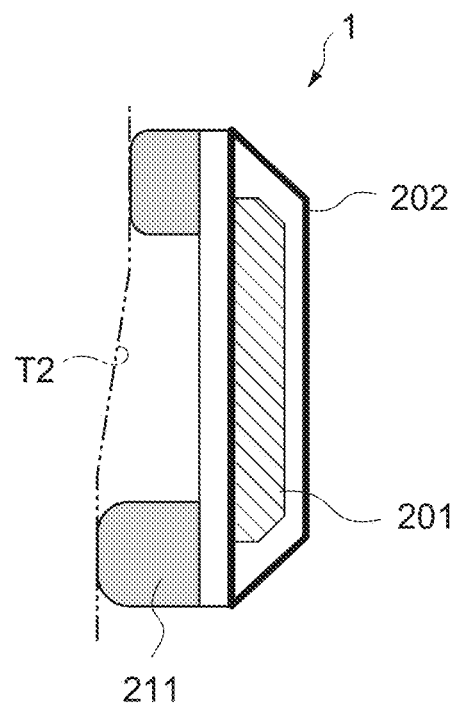
FIG. 5 An explanatory view of the action of the headphone of FIG. 5.

FIG. 4 is a schematic configuration diagram of a headphone unit 1 according to a comparative example. As shown in FIG. 4, the headphone unit 1 according to the comparative example does not include the structure portion 212 and the elastic layer 211 is supported by the housing 202. When the headphone unit 1 having such a configuration is mounted on the user's head, the elastic layer 211 deforms in accordance with the shape of a temporal portion T2 of the user as shown in FIG. 5 while the amount of compression is not uniform in each portion. As a result, it is difficult to mount the headphone unit 1 on the user's head with a constant pressing force over the entire circumference of the elastic layer 211 because of the presence of regions where the pressing force is strong and weak.

The overhead headphones need to be fixed to the user's head with a constant pressing force for stable mounting. However, if the pressing force is too strong, discomfort in mounting for a long time is caused, and if the pressing force is too weak, it makes mounting instable and sound leakage and deterioration of the sound insulation property are caused. Moreover, in the headphones having a noise canceling function, the noise canceling performance is lowered due to the deterioration of the sound insulation property.

Figure 6:
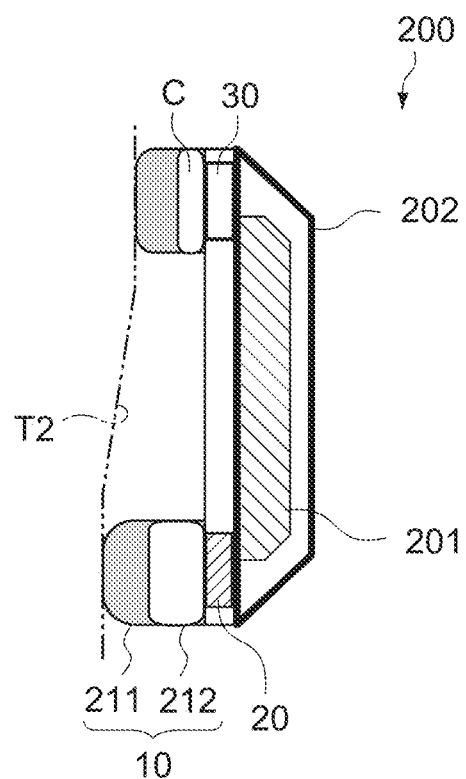
FIG. 6 An explanatory view of the action of the tactile sense presentation apparatus of FIG. 2.

In contrast, in the tactile sense presentation apparatus 200 according to this embodiment, the structure portion 212 is provided between the elastic layer 211 and the housing 202 and is configured such that the fluid pressure can be introduced into the variable-pressure chamber C in the structure portion 212 from the pump unit 20. Since the variable-pressure chamber C is formed in the annular shape corresponding to the shape of the elastic layer 211, the structure portion 212 is deformed (expanded or contracted) such that the thickness of the structure portion 212 in a region in which the amount of compression of the elastic layer 211 is larger is smaller than that in a region in which the amount of compression of the elastic layer 211 is smaller as shown in FIG. 6. Accordingly, the tactile sense presentation apparatus 200 can be fixed to the temporal portion T2 with a constant pressing force, and thus the shape and hardness of the elastic layer 211, the contact state with the temporal portion T2, and the like can be optimized and stable mountability, comfortable wearing feeling, reduction of sound leakage, improvement of the noise canceling performance due to enhancement of the sound insulation property, and the like can be achieved.

The magnitude of the fluid pressure introduced into the variable-pressure chamber C is not particularly limited, and can be arbitrarily set in accordance with the size of the user's head, the elastic force of a head band or the elastic layer 211, and the like. The fluid pressure may be fixed at a preset pressure or may be dynamically changed in accordance with the user's operation. Alternatively, as shown in FIG. 2, a pressure sensor 51 (first detector) that detects the pressure of the variable-pressure chamber C may be installed in the mounting portion 10 or the housing 202, and the driving of the pump unit 20 may be controlled by the control unit 30 such that the pressure of the variable-pressure chamber C is a predetermined value on the basis of the output of the sensor.

Figure 7:
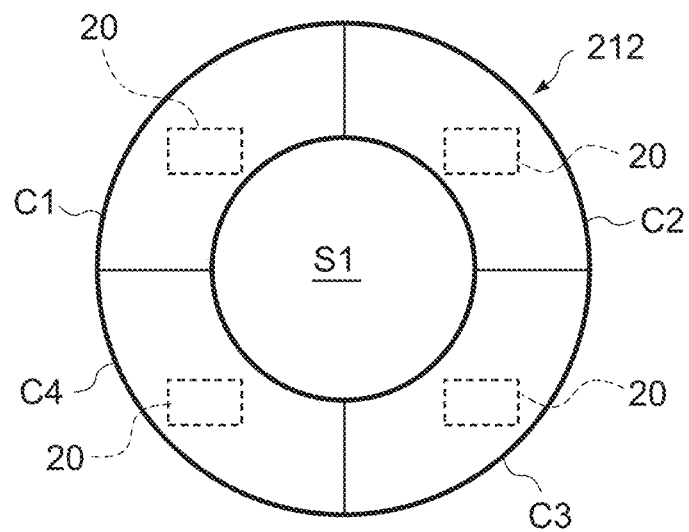
FIG. 7 A plan view showing main parts of a modified example of the configuration of the tactile sense presentation apparatus of FIG. 2.

The variable-pressure chamber C constituting the structure portion 212 is not limited to the annular body communicating over the entire circumference as described above, and a plurality of (four in the example shown in the figure) variable-pressure chambers C1, C2, C3, and C4 may be arranged in an annular shape as shown in FIG. 7. In this case, the internal pressure of each of the variable-pressure chambers C1 to C4 is individually controlled by individually arranging the pump unit 20 corresponding to the respective variable-pressure chambers C1 to C4. Also with such a configuration, actions and effects similar to those described above can be obtained. Moreover, only an arbitrary variable-pressure chamber can be selectively controlled to be expanded or contracted, and thus the pressing force can be optimized such that a stable wearing feeling can be obtained regardless of the user's attitude (e.g., upward or downward). It should be noted that the number of divisions of the variable-pressure chamber is not limited to four, and may be two, three, or five or more.

In the above description, the case where the tactile sense presentation apparatus 200 is applied to the headphone unit has been described as an example, though not limited thereto. For example, the tactile sense presentation apparatus 200 can also be applied to a head-mounted display (HMD). In this case, instead of the acoustic generator 201, a display panel that displays an image is applied as the electronic device. Also in this example, the mounting portion 210 can provide an optimal fit feeling in front of the user's eyes.

Third Embodiment

Figure 8:
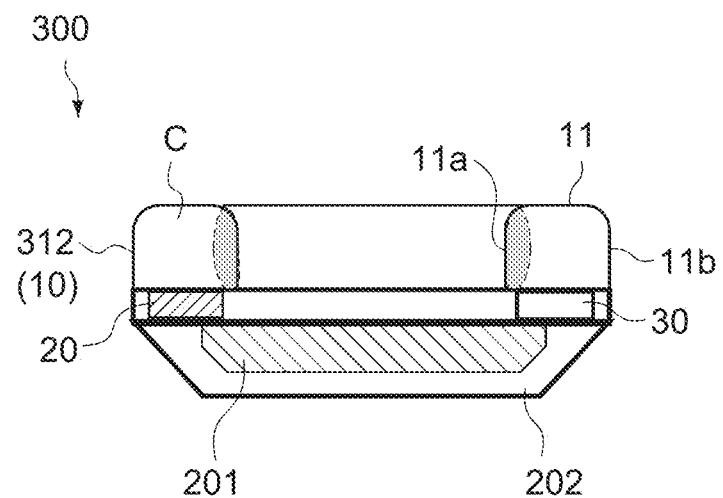
FIG. 8 A schematic side cross-sectional view of a tactile sense presentation apparatus according to a third embodiment of the present technology.

FIG. 8 is a schematic cross-sectional side view of a tactile sense presentation apparatus 300 according to a third embodiment of the present technology. It should be noted that portions corresponding to those of the second embodiment will be denoted by the same reference signs and detailed descriptions thereof will be omitted.

The tactile sense presentation apparatus 300 according to this embodiment constitutes the left and right headphone units in the overhead headphones as an electronic apparatus. The left and right headphone units are respectively provided at both ends of a headband (not shown), and here, a headphone unit on one side (e.g., left side) will be described.

The tactile sense presentation apparatus 300 according to this embodiment differs from the second embodiment in that the mounting portion 10 has a single-layer structure that is a structure portion 312. The structure portion 312 is a variable-volume bag-like object similarly to the structure portion 212 of the second embodiment and forms an annular variable-pressure chamber C communicable with the flow path of the fluid fed from the pump unit 20.

A surface material 11 forms the surface of the structure portion 312 and is deformable by the pressure in the variable-pressure chamber C. In particular, in this embodiment, the surface material 11 has a plurality of regions having different degrees of elongation when receiving the fluid pressure. In the example of FIG. 8, an inner peripheral portion 11a of the surface material 11 is constituted by a material having a higher degree of elongation than an outer peripheral portion 11b. Accordingly, when the fluid pressure is introduced into the variable-pressure chamber C, the inner peripheral portion 11a of the surface material 11 is deformed larger than the outer peripheral portion 11b. Accordingly, the tactile sense presentation apparatus 300 mainly has a force that wraps the ear portion from the outer periphery toward the inner periphery by the inner peripheral portion 11a of the surface material 11, rather than a force that pushes the temporal portion from the side. As a result, it is possible to suppress the feeling of pressure in mounting and to secure a favorable wearing feeling. Moreover, the increase in thickness of the structure portion 312 can be suppressed, and thus the deterioration of the sound quality caused by the change in distance between the acoustic generator 201 and the ear canal can be suppressed.

A technique of forming the inner peripheral portion 11a from a material different from the material of the outer peripheral portion 11b is typically used as a method of making the degree of elongation of the inner peripheral portion 11a of the surface material 11 higher than the degree of elongation of the outer peripheral portion 11b. For example, in a case where the surface material 11 is an elastic film, films having different elastic moduli are joined together. In a case where the surface material 11 is constituted by the same material, the inner peripheral portion 11a having a single layer and the outer peripheral portion 11b having a multilayer structure are employed, for example. In a case where the surface material is a knitted fabric, the inner peripheral portion 11a knitted to be easily elongated and the outer peripheral portion 11b knitted to be hardly elongated are employed.

Figure 9:
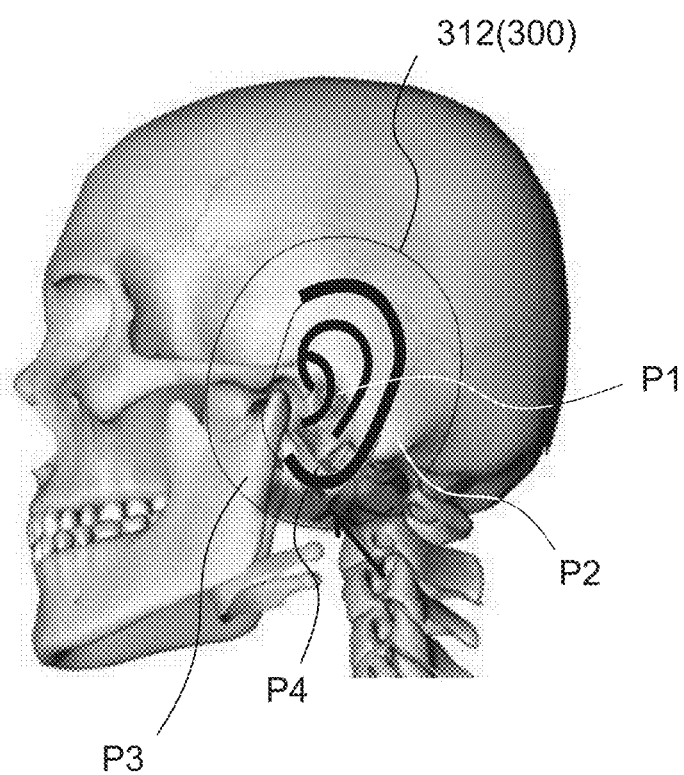
FIG. 9 A diagram describing a skeleton structure of a temporal portion of a human body.
Figure 10:
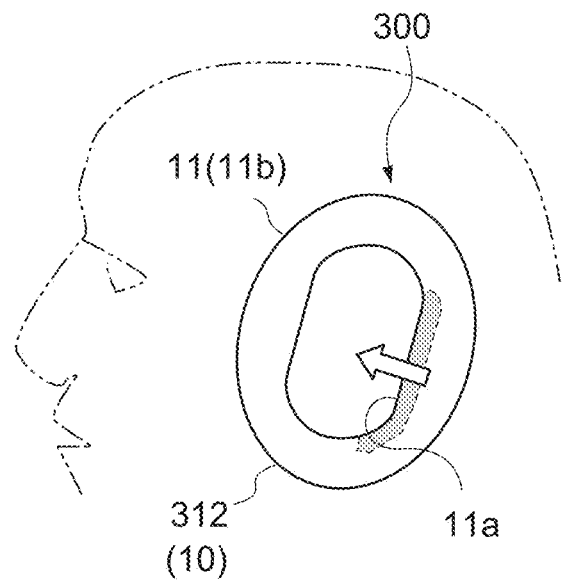
FIG. 10 An explanatory view of the action of the tactile sense presentation apparatus of FIG. 8.

The present technology is not limited to the example in which the inner peripheral portion 11a of the surface material 11 is constituted by the material having the high degree of elongation over the entire circumference thereof, and only a partial region of the inner peripheral portion 11a may be constituted by a material having a high degree of elongation. For example, as shown in FIG. 9, below an ear canal P1, a concave portion P4 exists between a mastoid process P2 in a lower part of a temporal bone and a mandibular ramus process P3 in an upper part of a mandible. Therefore, the inner peripheral portion 11a which comes into contact with the concave portion P4 when the tactile sense presentation apparatus 300 is mounted may be constituted by a material having a higher degree of elongation than the other regions. Accordingly, as shown in FIG. 10, a pressing force applied from the back side of the ear toward the front side is generated, and thus a wearing feeling with less feeling of pressure can be provided. Moreover, it is possible to effectively suppress sound leakage in the vicinity of the concave portion P4.

Fourth Embodiment

Figure 11:
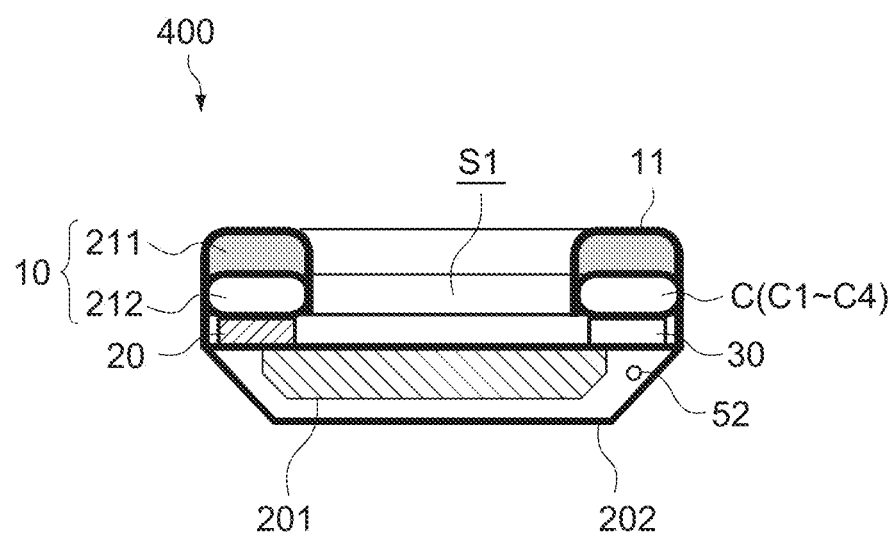
FIG. 11 A schematic side cross-sectional view of a tactile sense presentation apparatus according to a fourth embodiment of the present technology.

FIG. 11 is a schematic cross-sectional side view of a tactile sense presentation apparatus 400 according to a fourth embodiment of the present technology. It should be noted that portions corresponding to those of the second embodiment will be denoted by the same reference signs and detailed descriptions thereof will be omitted.

The tactile sense presentation apparatus 400 according to this embodiment constitutes left and right headphone units in overhead headphones as an electronic apparatus. The left and right headphone units are respectively provided at both ends of a headband (not shown), and here, a headphone unit on one side (e.g., left side) will be described.

The tactile sense presentation apparatus 400 according to this embodiment further includes an acceleration sensor 52. The acceleration sensor 52 is a detector (second detector) that detects the move and azimuth of a mounting portion 10 and is disposed in the mounting portion 10 or a housing 202. The acceleration sensor 52 outputs the detection signal to a control unit 30 and the control unit 30 determines the user's move and attitude on the basis of the detection signal from the acceleration sensor 52. Instead of or in addition to the acceleration sensor 52, another inertial sensor such as an angular velocity sensor, a geomagnetic sensor, or the like may be used. The tactile sense presentation apparatus 400 may include the pressure sensor 51 (see FIG. 2) that detects the internal pressure of the variable-pressure chamber C in addition to the acceleration sensor 52.

In the tactile sense presentation apparatus 400, the structure portion 312 (variable-pressure chamber C) may be constituted by a plurality of variable-pressure chambers C1 to C4 as shown in FIG. 7. In this case, as will be described later, it is possible to individually control any variable-pressure chamber on the basis of the output of the acceleration sensor 52 or the like. The number of variable-pressure chambers, the arrangement of the respective variable-pressure chambers, and the like are not particularly limited, and can be arbitrarily set.

Figure 12A:
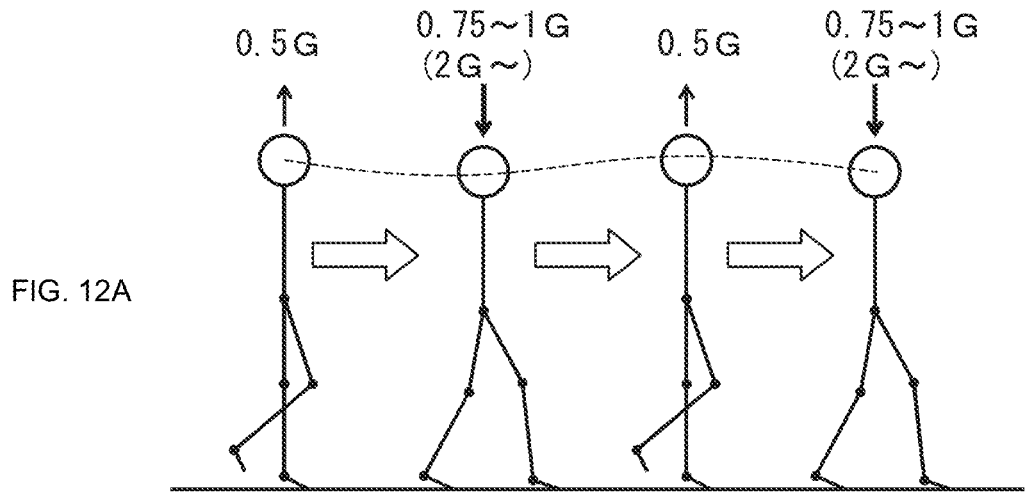
FIGS. 12A and 12B An explanatory view showing a relationship between a change (FIG. 12A) in position of the head and positional deviation (FIG. 12B) of the headphone when walking.

The detection axis of the acceleration sensor 52 is typically set to be parallel to the direction of gravity. Accordingly, a change in direction of gravity acting on the user's head while the user wearing the tactile sense presentation apparatus 400 is walking or running is detected. For example, as shown in FIG. 12A, upward and downward acceleration is generated in the head and the height position of the head changes while the user is normally walking. As one example, the upward acceleration is 0.5 G and the downward acceleration is 0.75 G to 1 G. Since the landing impact in walking fast, running, or the like when the walking speed is higher than that in the normal walking is larger than that in the walking, the downward acceleration is equal to or higher than 2 G, for example. Due to the inertial force caused by this acceleration, the tactile sense presentation apparatus 400 may be shifted in position from the user's head.

Figure 12B:
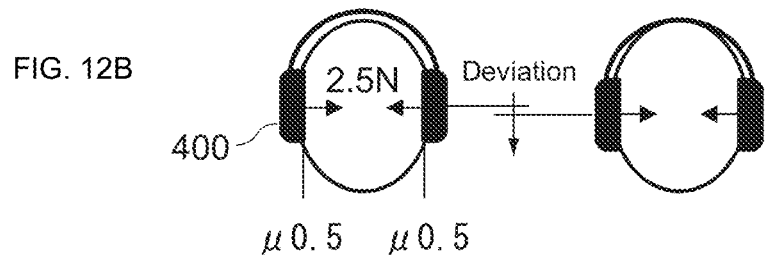
Figure 13:
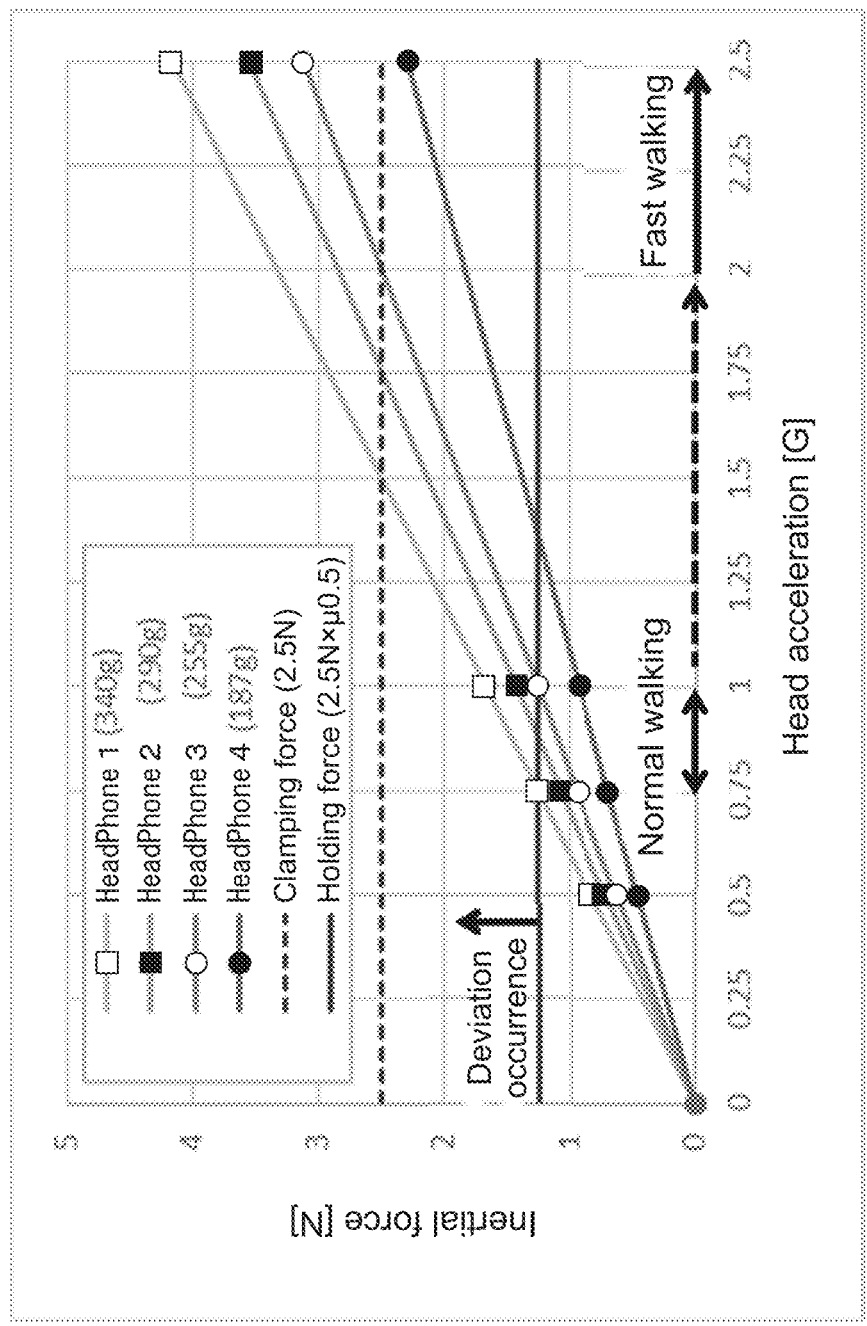
FIG. 13 An experimental result showing a relationship between upward and downward acceleration applied to the head and inertial force applied to the headphone.

In view of this, four headphones 1 to 4 with different weights were prepared as headphones including the tactile sense presentation apparatus 400 and the inertial forces of the headphones acting in walking were evaluated on the basis of the outputs of the acceleration sensor 52. The results are shown in FIG. 13. Here, as shown in FIG. 12B, the pressing force applied from the tactile sense presentation apparatus 400 to the user's temporal portion (clamping force of the head by the left and right tactile sense presentation apparatuses 400) was set to 2.5 N and the static friction coefficient (μ) between the tactile sense presentation apparatus 400 (surface material 11) and the temporal portion (skin or hair) was set to about 0.5 (holding force was 1.25 N (pressing force (2.5 N)×μ(0.5)). Moreover, the weight of the headphone 1 was set to 340 g, the weight of the headphone 2 was set to 290 g, the weight of the headphone 3 was set to 255 g, and the weight of the headphone 4 was set to 187 g.

As shown in FIG. 13, the relatively light headphones 3 and 4 do not cause positional deviation in the normal walking (0.75 G to 1 G) while the relatively heavy headphones 1 and 2 may cause positional deviation. On the other hand, in walking fast (2 G or more), the inertial force equal to or greater than the holding force acts on all of the four types of headphones 1 to 4, and thus the positional deviation is liable to occur. Although the positional deviation can be suppressed by increasing the pressing force of the tactile sense presentation apparatus 400 (clamping force of the headphone), the user feels pain due to the clamping, and the wearing comfort is hindered.

Therefore, in this embodiment, it is configured to be capable of suppressing the positional deviation of the tactile sense presentation apparatus 400 due to the inertial force by controlling the internal pressure of the variable-pressure chamber C on the basis of the output of the acceleration sensor 52. Typically, the driving of the pump unit 20 is controlled to increase the internal pressure of the variable-pressure chamber C when the detected acceleration exceeds a predetermined acceleration threshold. When the detected acceleration decreases below the acceleration threshold, the internal pressure of the variable-pressure chamber C is decreased to the initial set value. Thus, by increasing the pressing force (holding force) of the tactile sense presentation apparatus 400 only when there is a high possibility that the positional deviation occurs, it is possible to prevent the positional deviation of the tactile sense presentation apparatus 400 while securing the wearing comfort.

Such control can also be applied to a case where the inclination of the user's head is equal to or larger than a predetermined angle. For example, when the head is greatly inclined in front and back directions, positional deviation may occur due to the inertial force of the tactile sense presentation apparatus 400 or its own weight. Therefore, the positional deviation of the tactile sense presentation apparatus 400 due to the inclination of the head can be prevented by performing the control to increase the internal pressure of the variable-pressure chamber C when the tactile sense presentation apparatus 400 is inclined by a predetermined amount or more with respect to the direction of gravity on the basis of the output of the acceleration sensor 52.

Figure 14:
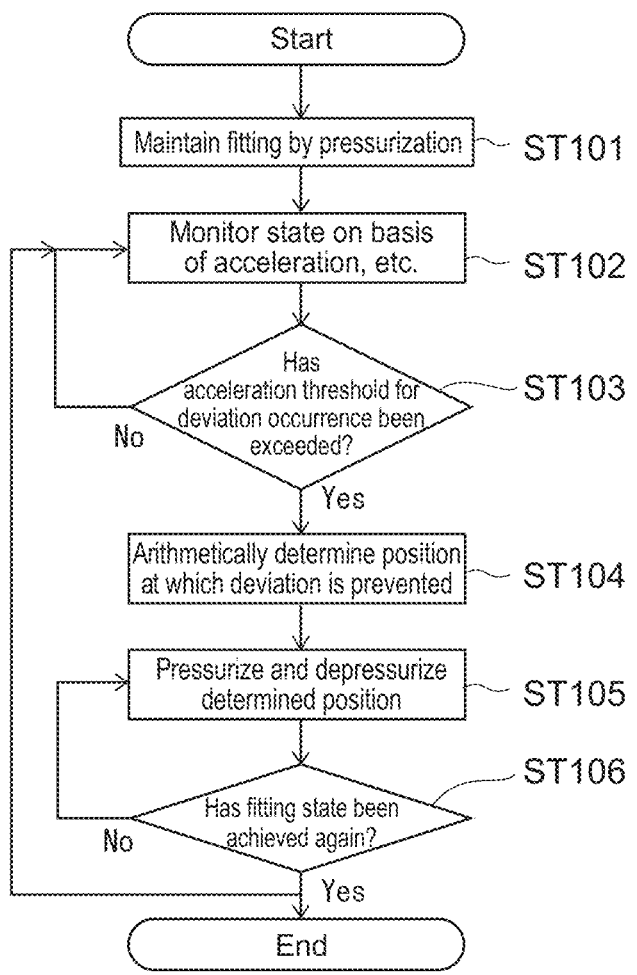
FIG. 14 A flowchart showing a control example of the tactile sense presentation apparatus of FIG. 11.

In addition, in a case where the variable-pressure chamber C is divided into a plurality of variable-pressure chambers C1 to C4, it is also possible to individually control any variable-pressure chamber in accordance with the direction of acceleration (see FIG. 14). In this case, the pressing force (holding force) can be increased only at required portions, and thus it is possible to further improve the wearing comfort as compared to the case where the pressing force is increased over the entire circumference of the mounting portion 10.

FIG. 14 is a flowchart showing an example of a drive control procedure of the pump unit 20, which is performed in the control unit 30.

When the headphones are mounted on the user's head, the controller 30 drives the pump unit 20 to pressurize the variable-pressure chamber C to maintain the desired fitting state (Step 101). In this state, as described in the above first embodiment, a constant pressing force is achieved over the entire region of the mounting portion 10 by the action of the structure portion 212 (variable-pressure chamber C).

Subsequently, the control unit 30 monitors the state of acceleration acting on the mounting portion 10 on the basis of the output of the acceleration sensor 52 (Step 102). Accordingly, the move of the head can be detected. It should be noted that in a case where the pressure sensor 51 is provided, the state of the internal pressure of the variable-pressure chamber C may be monitored on the basis of the output of the pressure sensor 51. In this case, it is possible to know a change in acceleration applied to the head due to the change in the internal pressure of the variable-pressure chamber C.

Subsequently, the control unit 30 determines whether or not the detected acceleration has exceeded an acceleration threshold which is an acceleration value that causes the positional deviation of the tactile sense presentation apparatus 400 (Step 103). The acceleration threshold is a value that differs depending on the weight of the headphones and is determined in advance by experiments or the like.

Subsequently, the control unit 30 determines where the adjustment of the pressing force (holding force) in the tactile sense presentation apparatus 400 is necessary in order to prevent the positional deviation (Step 104). According to the experimental example of FIG. 13, the downward acceleration is higher than the upward acceleration, and thus it is likely that the downward acceleration exceeds the acceleration threshold and the position of the tactile sense presentation apparatus 400 is deviated downward. In a case where the variable-pressure chamber C is divided into the plurality of variable-pressure chambers C1 to C4, the driving of the pump unit 20 corresponding to the variable-pressure chamber is controlled such that the internal pressure of the variable-pressure chamber (variable-pressure chambers C3 and C4 in the example of FIG. 7) located on the lower side in the direction of gravity increases in order to prevent the downward positional deviation of the tactile sense presentation apparatus 400 (Step 105). Accordingly, a pressing force to push the tactile sense presentation apparatus 400 upward is generated and the downward positional deviation of the tactile sense presentation apparatus 400 is suppressed.

It should be noted that at the same time, the driving of the pump unit 20 corresponding to the variable-pressure chamber may be controlled such that the internal pressure of the variable-pressure chamber (variable-pressure chambers C1 and C2 in the example of FIG. 7) located on the upper side in the direction of gravity decreases (Step 105). Accordingly, it is possible to further improve the wearing comfort while suppressing the downward positional deviation of the tactile sense presentation apparatus 400.

The internal pressure control of the variable-pressure chambers C1 to C4 above is repeatedly performed until the fitting state of the tactile sense presentation apparatus 400 achieves a desired fitting state (Step 106). The desired fitting state refers to, for example, a state in which it is restored to the fitting state at the beginning of mounting after the acceleration decreases to be equal to or lower than the acceleration threshold.

Fifth Embodiment

Figure 16:
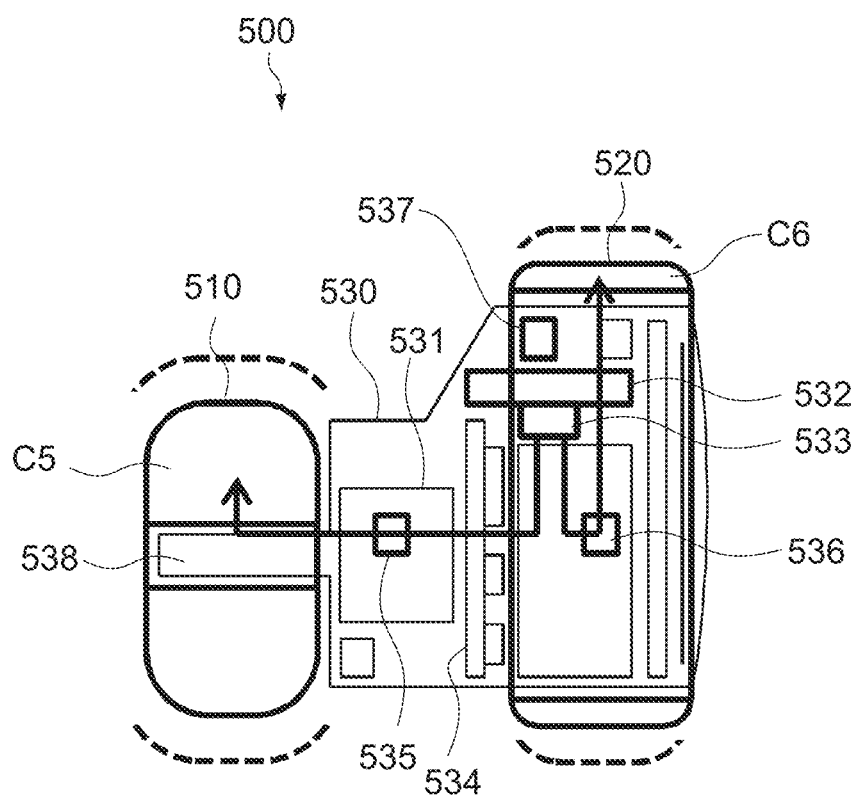
FIG. 16 A schematic side cross-sectional view showing an inner structure of the tactile sense presentation apparatus of FIGS. 15A, 15B, and 15C.

FIGS. 15A, 15B, and 15C show overall diagrams of a tactile sense presentation apparatus 500 according to a fifth embodiment of the present technology, and FIG. 15A shows perspective views from the front side, FIG. 15B shows side views, and FIG. 15C shows perspective views from the back side. FIG. 16 is a schematic side cross-sectional view showing an internal structure of the tactile sense presentation apparatus 500. The tactile sense presentation apparatus 500 according to this embodiment constitutes an in-ear headphone inserted into the ear canal as an electronic apparatus. Here, a headphone on one side (e.g., left side) will be described.

The tactile sense presentation apparatus 500 has an insertion portion 510 that is inserted into the ear canal and a mounting portion 520 that is mounted on an antihelix and these are constituted by an elastic material that is radially expandable under fluid pressure. The surface of the insertion portion 510 and the surface of the mounting portion 530 constitute a surface material that comes into contact with the user's ear.

It should be noted that in FIGS. 15A, 15B, and 15C, the state before expansion (initial time) is shown in the upper stage and the state after expansion (mounting time) is shown in the lower stage, and the circle or arc portion indicated by the solid line represents the expansion range. Moreover, in FIG. 16, the expansion ranges of the insertion portion 510 and the mounting portion 520 are indicated by the broken lines.

The tactile sense presentation apparatus 500 further includes a main body portion 530 that supports the insertion portion 510 and the mounting portion 520. The main body portion 530 houses an acoustic generator 531, a pump unit 532, a flow path switching valve 533, a control unit 534, a first pressure sensor 535, a second pressure sensor 536, an acceleration sensor 537, and the like.

The acoustic generator 531 is typically an electromagnetic dynamic speaker and transmits the generated sound to the ear canal through a sound path 538 formed inside the insertion portion 510. The pump unit 532 supplies a fluid (air) to an annular first variable-pressure chamber C5 formed inside the insertion portion 510 and outside the sound path 538 and an annular second variable-pressure chamber C6 formed inside the mounting portion 520. The switching valve 533 switches the supply destination of the fluid from the pump unit 20 between the first variable-pressure chamber C5 and the second variable-pressure chamber C6. The control unit 534 is configured as a drive circuit board that controls the driving of the acoustic generator 531, the pump unit 532, the switching valve 533, and the like. The control unit 534 is configured to be capable of controlling the driving of the pump unit 532 and the switching valve 533 on the basis of the outputs of the first pressure sensor 535, the second pressure sensor 536, and the acceleration sensor 537. The first pressure sensor 535 is disposed in a flow path connecting the pump unit 532 and the first variable-pressure chamber C5 and detects the internal pressure of the first variable-pressure chamber C5. The second pressure sensor 536 is disposed in a flow path connecting the pump unit 532 and the second variable-pressure chamber C6 and detects the internal pressure of the second variable-pressure chamber C6. The acceleration sensor 537 detects the direction and magnitude of the acceleration acting on the tactile sense presentation apparatus 500.

In the tactile sense presentation apparatus 500 according to this embodiment configured as described above, the control unit 534 controls the pump unit 532 and the switching valve 533 to supply the fluid to the first variable-pressure chamber C5 when the insertion portion 510 is inserted into the ear canal. Accordingly, the first variable-pressure chamber C5 is pressurized and expanded, and the surface of the insertion portion 510 comes into close contact with the inner wall of the ear canal. Based on the output of the first pressure sensor 535, the control unit 534 stops the pressurization of the first variable-pressure chamber C5 to maintain its internal pressure after the internal pressure of the first variable-pressure chamber C5 reaches a predetermined pressure.

The driving timing of the pump unit 532 by the control unit 534 is not particularly limited, and may be a time at which the user makes an input operation or may be a time at which the control unit 534 determines an increase in internal pressure of the first variable-pressure chamber C5 when the insertion portion 510 is inserted into the ear canal on the basis of the output of the first pressure sensor 535.

The control unit 534 controls the pump unit 532 and the switching valve 533 to supply the fluid to the second variable-pressure chamber C6. Accordingly, the second variable-pressure chamber C6 is pressurized and expanded and the surface of the mounting portion 520 comes into close contact with the antihelix. Based on the output of the second pressure sensor 536, the control unit 534 stops the pressurization of the second variable-pressure chamber C6 to maintain its internal pressure after the internal pressure of the second variable-pressure chamber C6 reaches the predetermined pressure. The pressurization of the second variable-pressure chamber C6 may be performed after the pressurization of the first variable-pressure chamber C5 or may be performed simultaneously with the pressurization of the first variable-pressure chamber C5.

The control unit 534 detects the direction and magnitude of the acceleration acting on the tactile sense presentation apparatus 500 on the basis of the output of the acceleration sensor 537. The control unit 534 detects the inclination of the user's head or the magnitude of the move on the basis of the output of the acceleration sensor 537. The control unit 534 performs control to pressurize at least one of the first variable-pressure chamber C5 or the second variable-pressure chamber C6 in a case where the control unit 534 determines that positional deviation or dropout may occur due to the own weight, the inertial force, or the like of the tactile sense presentation apparatus 500. Accordingly, the mounting stability of the tactile sense presentation apparatus 500 is increased, and it is possible to prevent the positional deviation or dropout. Moreover, since the control to pressurize the variable-pressure chambers C5 and C6 is performed only when acceleration or the like of a predetermined magnitude or more is detected, it is possible to prevent the comfort of the wearing feeling from being impaired.

Sixth Embodiment

Next, a sixth embodiment of the present technology will be described. In the second to fifth embodiments described above, the examples in which the tactile sense presentation apparatus is mainly applied to the headphones have been described, though the present technology is not limited thereto. The present technology can also be applied to an accessory such as shoes and wear. Hereinafter, an application example of the present technology to shoes will be described.

Figure 17:
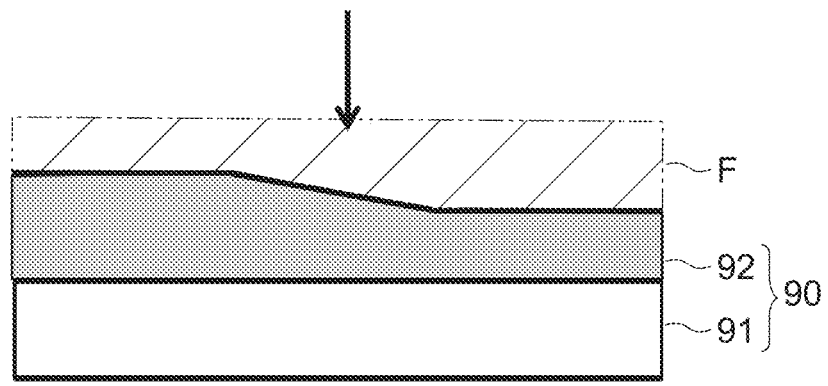

FIG. 17 is a cross-sectional view of main parts of a typical shoe 90 having a sole 91 and an insole 92 disposed thereon. In the shoe 90 having such a configuration, the load concentrates on a part of the insole 92 in a manner that depends on the shape of a foot F, the way of standing, and the way of weight application, and causes pain and discomfort. In this embodiment, the tactile sense presentation apparatus according to the present technology is applied to the insole as shown in FIG. 18 in order to suppress pain and discomfort caused by uneven deformation of the insole 92.

Figure 18:
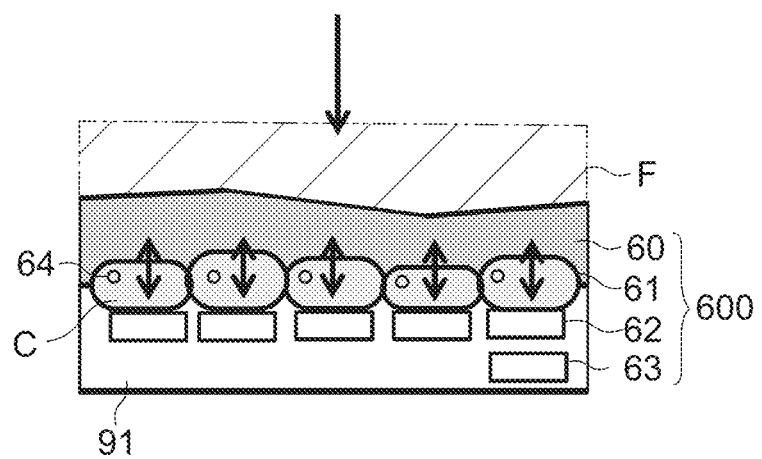

FIG. 18 is a cross-sectional view of main parts of a tactile sense presentation apparatus 600 according to a sixth embodiment of the present technology. As shown in the figure, the tactile sense presentation apparatus 600 according to this embodiment includes an insole 60, a structure portion 61 having a plurality of variable-pressure chambers C, a plurality of pump units 62 disposed corresponding to the respective variable-pressure chambers C, and a control unit 63 capable of individually controlling the plurality of pump units 62.

The insole 60 is configured as a mounting portion having a surface material that contacts the back of the foot F. The plurality of variable-pressure chambers C is disposed between the insole 60 and the sole 91 and arranged in a predetermined pattern over almost the entire lower surface of the insole 60. The shapes of the variable-pressure chambers C and the number of the variable-pressure chambers C are not particularly limited, and can be arbitrarily set in accordance with the shape, size, and the like of the insole 60, and the variable-pressure chambers C is arranged in a row or a plurality of rows from the toe side to the heel side of the insole 60, for example.

The tactile sense presentation apparatus 600 has a plurality of pressure sensors 64 that detects the internal pressure of each variable-pressure chamber C. The control unit 63 individually controls the plurality of pump units 62 on the basis of the outputs of the plurality of pressure sensors 64. Typically, the control unit 63 individually controls the shape of each variable-pressure chamber C in accordance with the user's body shape (shape of the foot F) or state (rest, violent move, etc.), to thereby realize an optimal shape, hardness, and contact state of the insoles 60. Accordingly, stable mountability, comfortable wearing feeling, pain alleviation and attitude correction by deviation correction in the way of standing or weight application, and the like can be achieved.

The control method is not particularly limited, and the internal pressure of each variable-pressure chamber C can be controlled in accordance with the size and pressure of each variable-pressure chamber C, for example. More specifically, when the size (height) of each variable-pressure chamber C is smaller than a predetermined value, the variable-pressure chamber having a relatively high internal pressure is selectively pressurized. Moreover, when the size (height) of each variable-pressure chamber C is equal to or greater than the predetermined value, the variable-pressure chamber having a relatively low internal pressure is selectively depressurized. It should be noted that the size (height) of the variable-pressure chamber C can be estimated on the basis of the flow rate of the fluid supplied to the variable-pressure chamber C or the like.

It should be noted that the present technology may also take the following configurations.

(1) A tactile sense presentation apparatus, including:
 a mounting portion that is mounted on a target object and includes a surface material which is deformable in at least a part of a contact portion with the target object;
 a pump unit that is connected to the mounting portion via a flow path, and feeds a fluid for deforming the surface material to the mounting portion; and
 a control unit that controls driving of the pump unit.

(2) The tactile sense presentation apparatus according to (1), in which
 the mounting portion further includes a variable-volume structure portion capable of deforming the surface material by receiving pressure of the fluid.

(3) The tactile sense presentation apparatus according to (2), in which
 the surface material has a plurality of regions having different degrees of elongation when receiving the pressure of the fluid.

(4) The tactile sense presentation apparatus according to (2) or (3), in which
 the structure portion has an annular variable-pressure chamber communicable with the flow path.

(5) The tactile sense presentation apparatus according to (2) or (3), in which
 the structure portion has a plurality of variable-pressure chambers capable of individually controlling an internal pressure.

(6) The tactile sense presentation apparatus according to any one of (1) to (5), further including
 an electronic device that is disposed in the mounting portion and capable of presenting a sense other than a tactile sense.

(7) The tactile sense presentation apparatus according to any one of (1) to (6), further including
 a first detector that detects the pressure of the fluid, in which
 the control unit controls the driving of the pump unit on the basis of an output of the first detector.

(8) The tactile sense presentation apparatus according to any one of (1) to (7), further including
 a second detector that detects a move or direction of the mounting portion, in which
 the control unit controls the driving of the pump unit on the basis of an output of the second detector.

(9) The tactile sense presentation apparatus according to any one of (1) to (8), in which
 the mounting portion further includes
 a temperature detector that detects a temperature of the surface material or the fluid, and
 a temperature adjustment unit that adjusts the temperature of the surface material or the fluid.

(10) The tactile sense presentation apparatus according to any one of (1) to (9), in which
 the control unit controls the driving of the pump unit on the basis of notification information from an external apparatus.

(11) The tactile sense presentation apparatus according to any one of (1) to (10), in which
 the fluid is air.

(12) An electronic apparatus including the tactile sense presentation apparatus according to any one of (1) to (11).

(13) The electronic apparatus according to (12), which is an over-ear headphone, an in-ear headphone, a neck speaker, a head-mounted display, an AR glass, a VR glass, a wristwatch, or a hearing aid.

(14) An accessory including the tactile sense presentation apparatus according to any one of (1) to (11).

(15) The accessory according to (14), which is eyeglasses, a glove, a shoe, a hat, a belt, or clothes.

(16) A holding apparatus, including:
 a mounting portion that is mounted on a target object and includes a surface material which is deformable in at least a part of a contact portion with the target object;
 a pump unit that includes a flow path, which is connected to the mounting portion, and feeds a fluid for deforming the surface material to the mounting portion; and
 a control unit that controls driving of the pump unit.

REFERENCE SIGNS LIST 10 mounting portion
11 surface material
13 sensor
14 temperature adjustment unit
20, 532 pump unit
21 flow path
30, 534 control unit
51, 535, 536 pressure sensor
52 acceleration sensor
61, 212, 312 structure portion
100, 200, 300, 400, 500, 600 tactile sense presentation apparatus
201 acoustic generator
131 pressure detector
132 temperature detector
C, C1, C2, C3, C4, C5, C6 variable-pressure chamber
T1 target object

The invention claimed is:

1. A tactile sense presentation apparatus, comprising:
a mounting portion mountable on a target object, wherein the mounting portion includes:
a surface material that includes a contact portion configured to be in contact with the target object, wherein the contact portion is deformable; and
a variable-volume structure portion that includes an elastic material;
a pump unit that includes a flow path, wherein
the flow path is connected to the mounting portion,
the flow path is configured to feed a fluid to the mounting portion for deformation of the surface material, and
the variable-volume structure portion is configured to deform the surface material by reception of pressure of the fluid; and
a control unit configured to control a drive of the pump unit.

2. The tactile sense presentation apparatus according to claim 1, wherein
the surface material further includes a plurality of regions having different degrees of elongation, and
the different degrees of elongation are based on the reception of the pressure of the fluid.

3. The tactile sense presentation apparatus according to claim 1, wherein the variable-volume structure portion further includes an annular variable-pressure chamber communicable with the flow path.

4. The tactile sense presentation apparatus according to claim 1, wherein the variable-volume structure portion further includes a plurality of variable-pressure chambers configured to control an internal pressure of the plurality of variable-pressure chambers.

5. The tactile sense presentation apparatus according to claim 1, further comprising an electronic device in the mounting portion,
wherein the electronic device is configured to present a sense different from a tactile sense.

6. The tactile sense presentation apparatus according to claim 1, further comprising a first detector configured to detect the pressure of the fluid,
wherein the control unit is further configured to control the drive of the pump unit based on an output of the first detector.

7. The tactile sense presentation apparatus according to claim 1, further comprising a second detector configured to detect at least one of a movement or an azimuth of the mounting portion,
wherein the control unit is further configured to control the drive of the pump unit based on an output of the second detector.

8. The tactile sense presentation apparatus according to claim 1, wherein the mounting portion further includes:
a temperature detector configured to detect a temperature of at least one of the surface material or the fluid; and
a temperature adjustment unit configured to adjust the temperature of the at least one of the surface material or the fluid.

9. The tactile sense presentation apparatus according to claim 1, wherein the control unit is further configured to control the drive of the pump unit based on notification information from an external apparatus.

10. The tactile sense presentation apparatus according to claim 1, wherein the fluid is air.

11. An electronic apparatus, comprising:
the tactile sense presentation apparatus according to claim 1.

12. The electronic apparatus according to claim 11, wherein the electronic apparatus is one of an over-ear headphone, an in-ear headphone, a neck speaker, a head-mounted display, an augmented reality (AR) glass, a virtual reality (VR) glass, a wristwatch, or a hearing aid.

13. An accessory, comprising:
the tactile sense presentation apparatus according to claim 1.

14. The accessory according to claim 13, wherein the accessory is one of a glove, a shoe, a hat, a belt, eyeglasses, or clothes.

15. A holding apparatus, comprising:
a mounting portion mountable on a target object, wherein the mounting portion includes:
a surface material that includes a contact portion configured to be in contact with the target object, wherein the contact portion is deformable; and
a variable-volume structure portion that includes an elastic material;
a pump unit that includes a flow path, wherein
the flow path is connected to the mounting portion,
the flow path is configured to feed a fluid to the mounting portion for deformation of the surface material, and
the variable-volume structure portion is configured to deform the surface material by reception of pressure of the fluid; and
a control unit configured to control a drive of the pump unit.

* * * * *